(12) United States Patent
Ishibashi

(10) Patent No.: US 12,608,347 B2
(45) Date of Patent: Apr. 21, 2026

(54) INFORMATION PROCESSING SYSTEM, INFORMATION PROCESSING APPARATUS, SERVER APPARATUS, PROGRAM, OR METHOD

(71) Applicant: ISHIBASHI FOUNDATION, Tokyo (JP)

(72) Inventor: Naoki Ishibashi, Tokyo (JP)

(73) Assignee: Ishibashi Foundation, Tokyo (JP)

( * ) Notice: Subject to any disclaimer, the term of this patent is extended or adjusted under 35 U.S.C. 154(b) by 0 days.

(21) Appl. No.: 17/916,692

(22) PCT Filed: Jun. 30, 2020

(86) PCT No.: PCT/JP2020/025658
§ 371 (c)(1),
(2) Date: Oct. 3, 2022

(87) PCT Pub. No.: WO2022/003821
PCT Pub. Date: Jan. 6, 2022

(65) Prior Publication Data
US 2023/0153277 A1      May 18, 2023

(51) Int. Cl.
G06F 16/21      (2019.01)
G06F 16/25      (2019.01)
(52) U.S. Cl.
CPC .......... G06F 16/211 (2019.01); G06F 16/252 (2019.01)
(58) Field of Classification Search
CPC ............................ G06F 16/211; G06F 16/252
See application file for complete search history.

(56) References Cited

U.S. PATENT DOCUMENTS 10,621,198 B1      4/2020      Levin
2005/0234749 A1*   10/2005    Attebury ................ G06Q 10/02
                                                            705/5
(Continued)

FOREIGN PATENT DOCUMENTS

EP          3 449 414 A1      3/2019
JP          H8-190506 A       7/1996
(Continued)

OTHER PUBLICATIONS

Extended Search Report issued on Aug. 11, 2023 in EP Application No. 20942524.8.

(Continued)

*Primary Examiner* — Jensen Hu
(74) *Attorney, Agent, or Firm* — Finnegan, Henderson, Farabow, Garrett & Dunner, LLP

(57)      ABSTRACT

A system in an example of the present invention can more appropriately support appreciation of a work of art. A system includes a database unit capable of storing first art data, second art data, and third art data, a first access providing unit connected to the database unit and capable of providing the first art data via a first network in a first art facility, a second access providing unit connected to the database unit and capable of providing the second art data which is a part of the first art data, via a second network in a second art facility, and a third access providing unit connected to the database unit and capable of providing the third art data, which is a part of the first art data, via a third network provided to public.

16 Claims, 13 Drawing Sheets

(56)                References Cited

U.S. PATENT DOCUMENTS

| | | | |
|---|---|---|---|
| 2012/0278721 A1 | 11/2012 | Beidel | |
| 2012/0317657 A1 | 12/2012 | Glimcher et al. | |
| 2013/0073400 A1* | 3/2013 | Heath | G06Q 50/01 |
| | | | 715/738 |
| 2013/0074191 A1 | 3/2013 | Ben-Reuven | |
| 2016/0277661 A1* | 9/2016 | Brav | H04N 23/80 |
| 2018/0288213 A1* | 10/2018 | Bjontegard | A63F 13/332 |
| 2019/0066052 A1* | 2/2019 | Boutros | G06F 16/248 |
| 2019/0230387 A1* | 7/2019 | Gersten | G06F 16/783 |
| 2020/0327252 A1 | 10/2020 | McFall et al. | |
| 2021/0271777 A1 | 9/2021 | Netsch et al. | |

FOREIGN PATENT DOCUMENTS

| | | |
|---|---|---|
| JP | 2001-167031 A | 6/2001 |
| JP | 2002-032495 A | 1/2002 |
| JP | 2002-215900 A | 8/2002 |
| JP | 2003-296587 A | 10/2003 |
| JP | 2004-030120 A | 1/2004 |
| JP | 2005-165663 A | 6/2005 |
| WO | WO 2020/083891 A | 4/2020 |

OTHER PUBLICATIONS

Notice of Reasons for Refusal issued in JP 2022-199888, dated Apr. 23, 2024.

Multimedia strategy of NTT Data Communications, Examples of constructing multimedia information system, Business Communication, Jul. 1, 1995, vol. 32 No. 7, pp. 39-44.

Hisashi Noguchi, First integrated information system to manage the entire museum in Japan, Computopia Renewal No. 3, Computer Age Co., Ltd., Mar. 1, 1995, vol. 29, No. 342, pp. 51-57.

Notice of Decision of Refusal issued in JP 2022-199888, dated Sep. 3, 2024.

* cited by examiner

FIG. 5

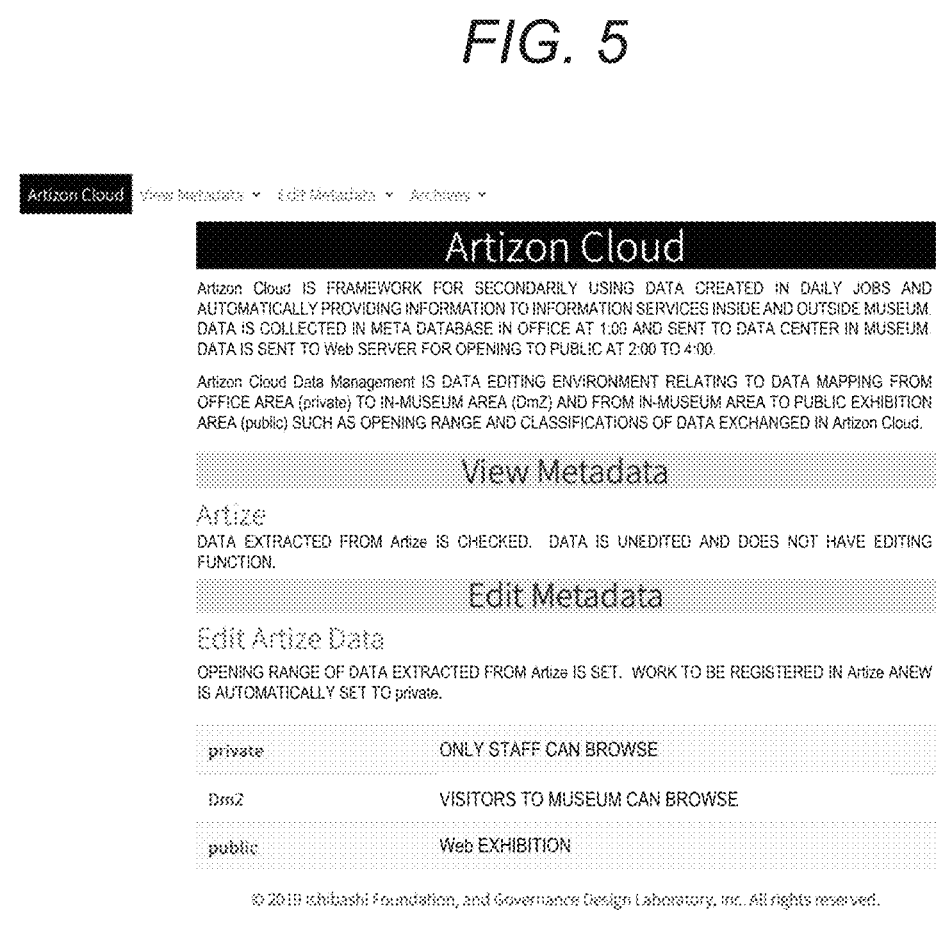

Artizon Cloud　　View Metadata ∨　　Edit Metadata ∨　　Archives ∨

Artizon Cloud

Artizon Cloud IS FRAMEWORK FOR SECONDARILY USING DATA CREATED IN DAILY JOBS AND AUTOMATICALLY PROVIDING INFORMATION TO INFORMATION SERVICES INSIDE AND OUTSIDE MUSEUM. DATA IS COLLECTED IN META DATABASE IN OFFICE AT 1:00 AND SENT TO DATA CENTER IN MUSEUM. DATA IS SENT TO Web SERVER FOR OPENING TO PUBLIC AT 2:00 TO 4:00.

Artizon Cloud Data Management IS DATA EDITING ENVIRONMENT RELATING TO DATA MAPPING FROM OFFICE AREA (private) TO IN-MUSEUM AREA (DmZ) AND FROM IN-MUSEUM AREA TO PUBLIC EXHIBITION AREA (public) SUCH AS OPENING RANGE AND CLASSIFICATIONS OF DATA EXCHANGED IN Artizon Cloud.

View Metadata

Artize

DATA EXTRACTED FROM Artize IS CHECKED. DATA IS UNEDITED AND DOES NOT HAVE EDITING FUNCTION.

Edit Metadata

Edit Artize Data

OPENING RANGE OF DATA EXTRACTED FROM Artize IS SET. WORK TO BE REGISTERED IN Artize ANEW IS AUTOMATICALLY SET TO private.

| private | ONLY STAFF CAN BROWSE |
| --- | --- |
| Dm2 | VISITORS TO MUSEUM CAN BROWSE |
| public | Web EXHIBITION |

FIG. 7

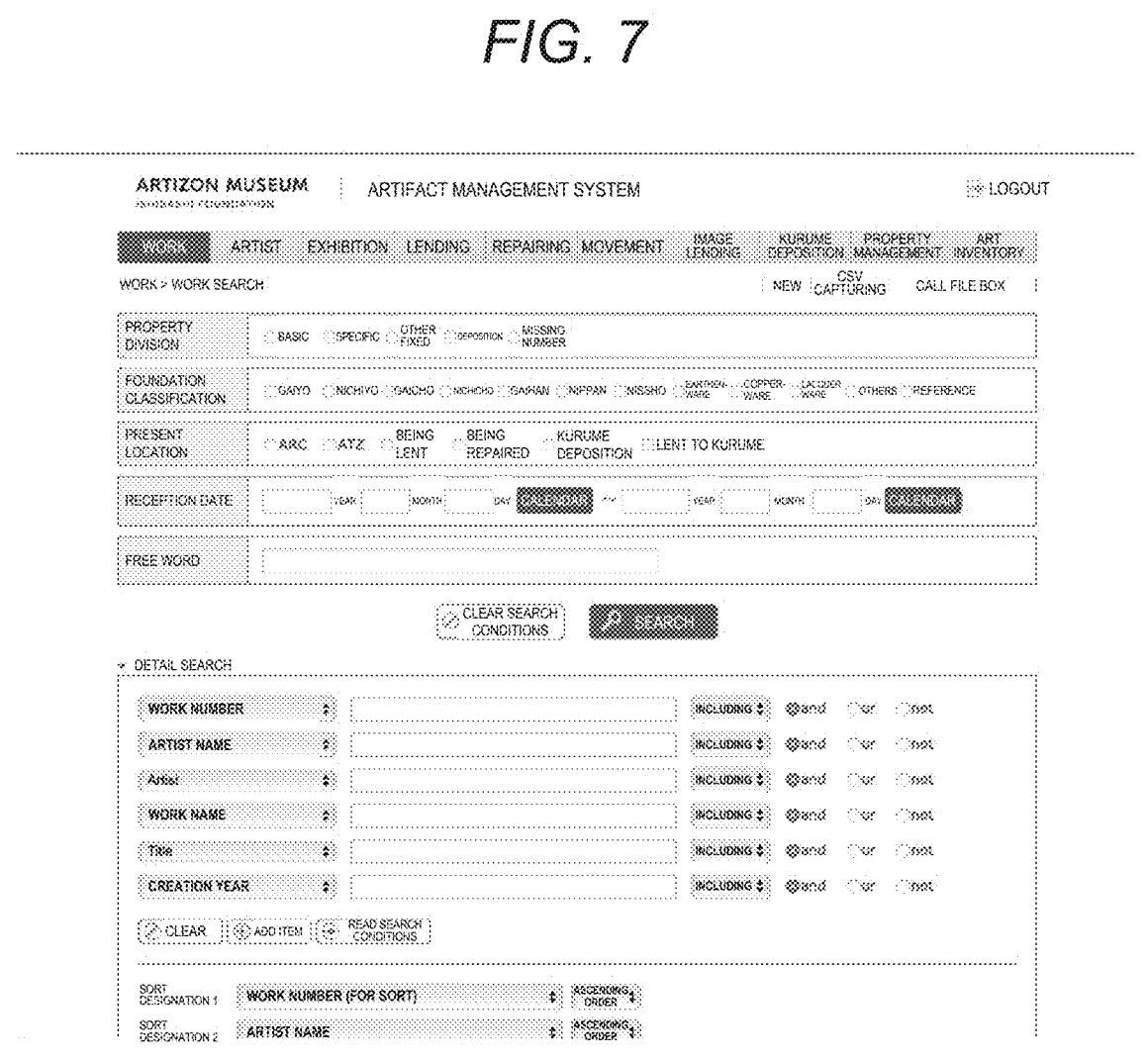

ARTIZON MUSEUM      ARTIFACT MANAGEMENT SYSTEM                    LOGOUT

WORK      ARTIST   EXHIBITION   LENDING   REPAIRING   MOVEMENT   IMAGE LENDING   KURUME DEPOSITION   PROPERTY MANAGEMENT   ART INVENTORY

WORK > WORK SEARCH                                    NEW   CSV CAPTURING   CALL FILE BOX

| PROPERTY DIVISION | BASIC   SPECIFIC   OTHER FIXED   DEPOSITION   MISSING NUMBER |
|---|---|
| FOUNDATION CLASSIFICATION | GAIYO   NICHIYO   GAICHO   NICHICHO   GAIHAN   NIPPAN   NISSHO   EARTHEN-WARE   COPPER-WARE   LACQUER WARE   OTHERS   REFERENCE |
| PRESENT LOCATION | ARC   ATZ   BEING LENT   BEING REPAIRED   KURUME DEPOSITION   LENT TO KURUME |
| RECEPTION DATE | YEAR   MONTH   DAY [    ]  ~  YEAR   MONTH   DAY [    ] |
| FREE WORD | |

CLEAR SEARCH CONDITIONS          SEARCH

▼ DETAIL SEARCH

| WORK NUMBER ⇕ | | INCLUDING ⇕ | ⊙and ○or ○not |
|---|---|---|---|
| ARTIST NAME ⇕ | | INCLUDING ⇕ | ⊙and ○or ○not |
| Artist ⇕ | | INCLUDING ⇕ | ⊙and ○or ○not |
| WORK NAME ⇕ | | INCLUDING ⇕ | ⊙and ○or ○not |
| Title ⇕ | | INCLUDING ⇕ | ⊙and ○or ○not |
| CREATION YEAR ⇕ | | INCLUDING ⇕ | ⊙and ○or ○not |

CLEAR      ADD ITEM      READ SEARCH CONDITIONS

SORT DESIGNATION 1   WORK NUMBER (FOR SORT) ⇕   ASCENDING ORDER ⇕

SORT DESIGNATION 2   ARTIST NAME ⇕   ASCENDING ORDER ⇕

FIG. 8

ISHIBASHI FOUNDATION DIGITAL ARCHIVE SYSTEM

Ishibashi Foundation
Digital Archive System for Heritage

FIG. 9

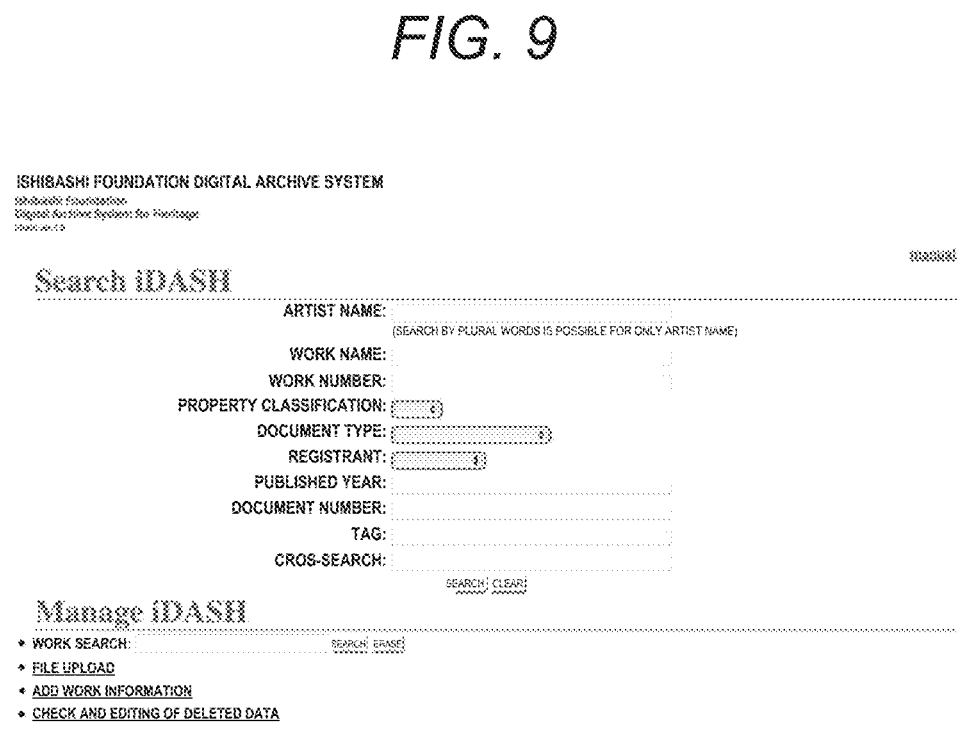

ISHIBASHI FOUNDATION DIGITAL ARCHIVE SYSTEM
Ishibashi Foundation
Digital Archive System for Heritage

Search iDASH

| | |
|---|---|
| ARTIST NAME: | |
| | (SEARCH BY PLURAL WORDS IS POSSIBLE FOR ONLY ARTIST NAME) |
| WORK NAME: | |
| WORK NUMBER: | |
| PROPERTY CLASSIFICATION: | |
| DOCUMENT TYPE: | |
| REGISTRANT: | |
| PUBLISHED YEAR: | |
| DOCUMENT NUMBER: | |
| TAG: | |
| CROS-SEARCH: | |

SEARCH CLEAR

Manage iDASH

* WORK SEARCH:          SEARCH ERASE
* FILE UPLOAD
* ADD WORK INFORMATION
* CHECK AND EDITING OF DELETED DATA

Figure 12:
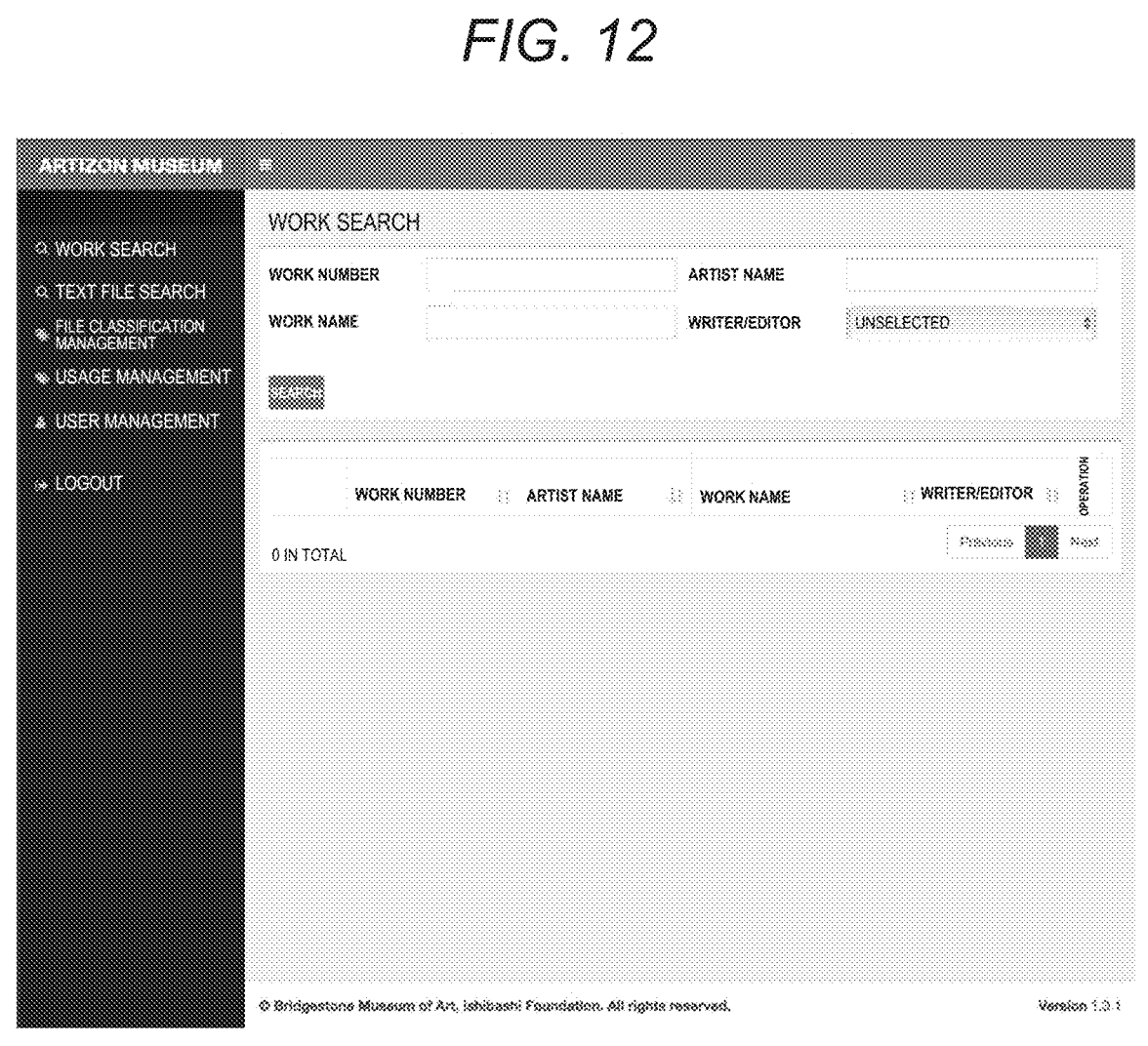

ARTIZON MUSEUM ≡

- Q WORK SEARCH
- Q TEXT FILE SEARCH
- ✴ FILE CLASSIFICATION MANAGEMENT
- ✴ USAGE MANAGEMENT
- ♣ USER MANAGEMENT
- ⇥ LOGOUT

WORK SEARCH

| WORK NUMBER | | ARTIST NAME | |
| WORK NAME | | WRITER/EDITOR | UNSELECTED |

Search

| WORK NUMBER | ARTIST NAME | WORK NAME | WRITER/EDITOR | OPERATION |
|---|---|---|---|---|

0 IN TOTAL                                                    Previous   Next

© Bridgestone Museum of Art, Ishibashi Foundation. All rights reserved.                    Version 1.3.1

*FIG. 13*

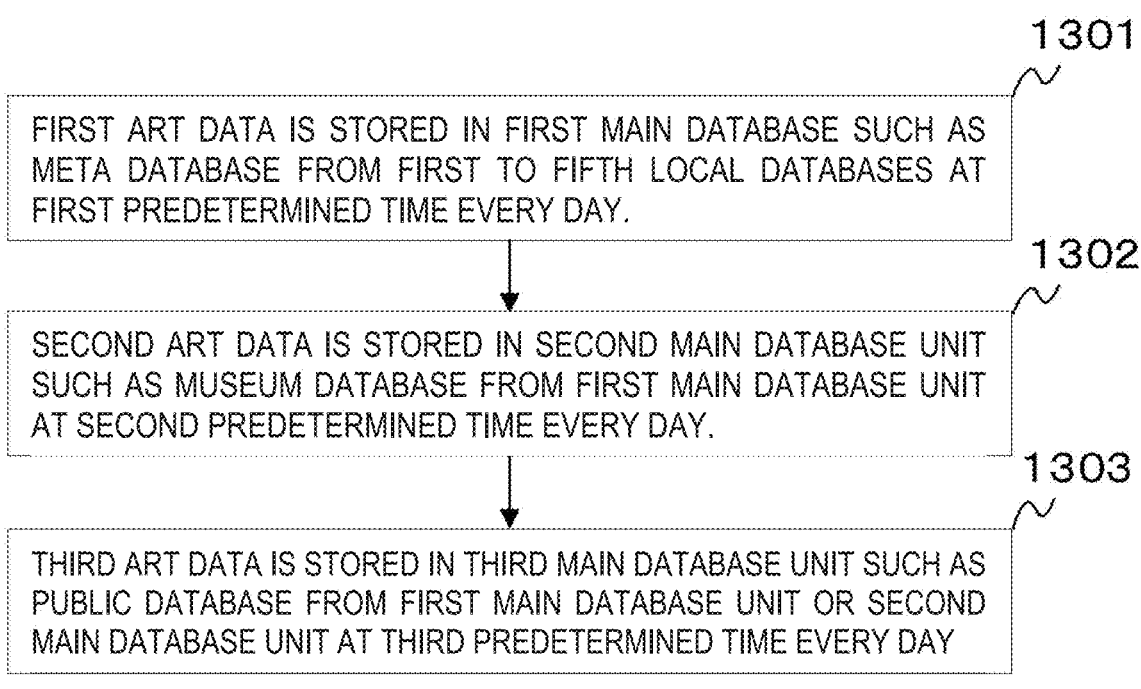

1301

FIRST ART DATA IS STORED IN FIRST MAIN DATABASE SUCH AS META DATABASE FROM FIRST TO FIFTH LOCAL DATABASES AT FIRST PREDETERMINED TIME EVERY DAY.

1302

SECOND ART DATA IS STORED IN SECOND MAIN DATABASE UNIT SUCH AS MUSEUM DATABASE FROM FIRST MAIN DATABASE UNIT AT SECOND PREDETERMINED TIME EVERY DAY.

1303

THIRD ART DATA IS STORED IN THIRD MAIN DATABASE UNIT SUCH AS PUBLIC DATABASE FROM FIRST MAIN DATABASE UNIT OR SECOND MAIN DATABASE UNIT AT THIRD PREDETERMINED TIME EVERY DAY

INFORMATION PROCESSING SYSTEM, INFORMATION PROCESSING APPARATUS, SERVER APPARATUS, PROGRAM, OR METHOD

TECHNICAL FIELD

The technology disclosed in the present application relates to an information processing system, an information processing apparatus, a server apparatus, a program, or a method.

BACKGROUND ART

There are various technologies as an information technology for supporting people in appreciating art.

CITATION LIST

Patent Literature

Patent Literature 1: JP 2005-165663 A
Patent Literature 2: JP 2001-167031 A
Patent Literature 3: JP 2003-296587 A

SUMMARY OF INVENTION

Technical Problem

However, there is no information processing technology that more appropriately supports people in appreciating works of art. Therefore, various embodiments of the present invention provide an information processing system, an information processing apparatus, a server apparatus, a program, or a method in order to solve the above problems.

Solution to Problem

A system according to an embodiment of this application includes:

a database unit capable of storing first art data, second art data, and third art data;

a first access providing unit connected to the database unit and capable of providing the first art data via a first network in a first art facility;

a second access providing unit connected to the database unit and capable of providing the second art data based on the first art data via a second network in a second art facility; and a third access providing unit connected to the database unit and capable of providing the third art data based on the first art data via a third network provided to public. Note that the system having such a form may not include the first to third networks themselves as components.

A system according to a second embodiment of this application is the system according to the first embodiment, wherein the first art data includes data relating to an academic material concerning a work of art served for browsing in the second art facility.

A system according to a third embodiment of this application is the system according to the first or second embodiment, wherein the first network is accessible from a terminal set in the first art facility, the terminal relating to a person who creates data relating to a work of art served for browsing by the second art facility.

A system according to a fourth embodiment of this application is the system according to any one of the first to third embodiments, wherein a part or all of data relating to a work of art served for browsing by the second art facility is stored in the database unit that stores the second art data in a predetermined period.

A system according to a fifth embodiment of this application is the system according to any one of the first to fourth embodiments, further including a terminal set in the first art facility that displays a screen capable of setting, for data stored in the database unit, as an accessible range, at least any one of the first art data that can be provided by the first access providing unit via the first network, the second art data that can be provided by the second access providing unit via the second network, and the third art data that can be provided by the third access providing unit via the third network.

A system according to a sixth embodiment of this application is the system according to any one of the first to fifth embodiments, wherein the second art data includes data about a work of art served for browsing in the second art facility.

A system according to a seventh embodiment of this application is the system according to any one of the first to sixth embodiments, wherein the second network is accessible from a terminal in the second art facility by a person who visits the second art facility.

A system according to an eighth embodiment of this application is the system according to any one of the first to seventh embodiments, wherein the second art data is accessible using Web API via the second network.

A system according to a ninth embodiment of this application is the system according to any one of the first to eighth embodiments, wherein the second art data includes data about an art facility relating to a work of art having a predetermined relationship with one work of art set in the second art facility.

A system according to a tenth embodiment of this application is the system according to any one of the first to ninth embodiments, wherein an art facility relating to a work of art having the predetermined relationship is limited to an art facility, a geographical distance of which from the second art facility is shorter than a predetermined distance.

A system according to an eleventh embodiment of this application is the system according to any one of the first to tenth embodiments, wherein the second art data includes data of a work of art having a predetermined relationship with one work of art set in the second art facility.

A system according to a twelfth embodiment of this application is the system according to any one of the first to eleventh embodiments, wherein a work of art having a predetermined relationship with the one work of art includes a work of art created by a creator of the one work of art, a work of art created by a creator in a group to which the creator of the one work of art belongs, a work of art created in series with the one work of art, and/or a work of art created in a same period as a creation age when the one work of art is created.

A system according to a thirteenth embodiment of this application is the system according to any one of the first to twelfth embodiments, wherein the system is cooperative with one or a plurality of databases that store a part or all of the first art data.

A system according to a fourteenth embodiment of this application is the system according to any one of the first to thirteenth embodiments, further including a converter that changes information stored in the one or the plurality of databases to generate the second art data.

A system according to a fifteenth embodiment of this application is the system according to any one of the first to fourteenth embodiments, wherein the database stores work of art information about a work of art stored in correlation with the first art facility.

A system according to a sixteenth embodiment of this application is the system according to any one of the first to fifteenth embodiments, wherein the database includes past information about a work of art served for browsing in the first art facility.

A system according to a seventeenth embodiment of this application is the system according to any one of the first to sixteenth embodiments, wherein the past information includes evaluation information, trade information, and/or restoration information for the work of art.

A system according to an eighteenth embodiment of this application is the system according to any one of the first to seventeenth embodiments, wherein the database stores data served for commentary on a work of art provided in the first art facility.

A system according to a nineteenth embodiment of this application is the system according to any one of the first to eighteenth embodiments, wherein the information served for commentary on the work of art includes sound, a moving image, and/or text.

A system according to a twentieth embodiment of this application is the system according to any one of the first to nineteenth embodiments, wherein the database stores information relating to an event held in correlation with an inside of the first art facility.

A system according to a twenty-first embodiment of this application is the system according to any one of the first to twentieth embodiments, wherein, in the one or the plurality of databases, information relating to the first art is managed with a work of art name and an ID or a creator and an ID of the work of art.

A system according to a twenty-second embodiment of this application is the system according to any one of the first to twenty-first embodiments, wherein the first art facility and the second art facility are a same art facility.

A system according to a twenty-third embodiment of this application is the system according to any one of the first to twenty-second embodiments, wherein the second art data includes image data A obtained by imaging one work of art, and the third art data includes image data B obtained by imaging the one work of art having lower resolution than the image data A.

A method according to a twenty-fourth embodiment of this application is a method including:

in a system including a database unit capable of storing first art data, second art data, and third art data, a step in which the database unit stores the first art data;

a step in which a first access providing unit in the system provides, via a first network provided in a first art facility, access to the first art data;

a step in which the database unit stores second art data;

a step in which a second access providing unit in the system provides, via a second network provided in a second art facility, access to the second art data based on the first art data;

a step in which the database unit stores third art data; and a step in which a third access providing unit in the system provides, via a third network provided to public, access to the third art data based on the first art data.

A program according to a twenty-fifth embodiment of this application is a program for:

in a system including database unit capable of storing first art data, second art data, and third art data, causing the database unit to operate as means for storing the first art data;

causing a first access providing unit in the system to operate as means for providing, via a first network provided in a first art facility, access to the first art data;

causing the database unit to operate as means for storing second art data;

causing a second access providing unit in the system to operate as means for providing, via a second network provided in a second art facility, access to the second art data based on the first art data;

causing the database unit to operate as means for storing third art data; and causing a third access providing unit in the system to operate as means for providing, via a third network provided to public, access to the third art data based on the first art data.

A program according to a twenty-sixth embodiment of this application is a program for causing a computer to function as the system according to any one of the first to twenty-third embodiments.

Advantageous Effects of Invention

According to an embodiment of the present invention, it is possible to support appreciation of a work of art more appropriately.

BRIEF DESCRIPTION OF DRAWINGS

FIG. 5 is an example of a screen displayed by the system according to the embodiment.

FIG. 7 is an example of a screen displayed by the system according to the embodiment.

FIG. 8 is an example of a screen displayed by the system according to the embodiment.

FIG. 9 is an example of a screen displayed by the system according to the embodiment.

FIG. 10 is an example of a screen displayed by the system according to the embodiment.

FIG. 12 is an example of a screen displayed by the system according to the embodiment.

FIG. 13 is an example of a flow processed in the system according to the embodiment.

Figure 1:
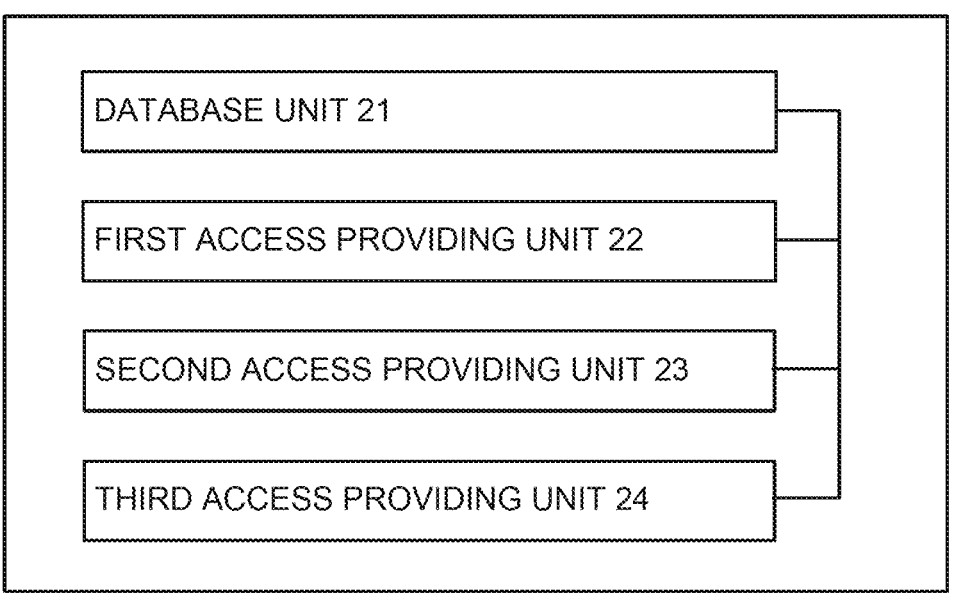
FIG. 1 is a block diagram illustrating functions of a system according to an embodiment.

1. Overview of a system according to an embodiment of the Present Invention

In recent years, facilities that provide appreciation of works of art such as art museums, not only have provided works of art themselves but also have incorporated various ideas that make works of art more familiar. An embodiment of the present invention relates to a system for supporting appreciation of works of art. Note that, in this application document, the term "system" may include one or a plurality of information processing apparatuses. The information processing apparatus is explained below. In this application document, the term "work of art" may be a term of a superordinate concept of various works of art such as a painting, an engraving, a garden, a craft, a ceramic art, a photograph, architecture, a flower arrangement, a painting, origami, and an ukiyo-e and may be a term of a superordinate concept of various things such as literature, design, and a comprehensive art.

2. Functions of a system according to one embodiment

A system according to an embodiment of the present invention may include a part or all of a database unit, a first access providing unit, a second access providing unit, and a third access providing unit explained below.

2.1. Database unit 21

The database unit has a function of managing a database. The database unit may be configured from one or a plurality of databases. The database unit may have a function of managing information such as addition and/or deletion of information with respect to the one or the plurality of databases.

The database unit may store a part or all of first art data.

The database unit may be connected to an internal database as a part of components of the system or may be connected to an external database other than the components of the system. In the latter, an example system may be capable of cooperating with an external local database unit including one or a plurality of databases.

An internal or external example local database unit to which the database unit is connectable may store work of art information about works of art correlating with a first art facility.

The work of art information may include, for example, information relating to a work of art itself, information relating to a creation place of the work of art, information relating to a creator of the work of art, information relating to a type of the work of art, and/or information relating to a creation period of the work of art.

The information relating to the work of art itself may include one or a plurality of image files obtained by imaging the work of art. The image file may be an image file obtained by imaging the work of art from various directions according to the nature of the work of art. For example, if the work of art is a painting, the image file may be an image file captured from the front of the painting. However, if the work of art is three-dimensional, the image file may be one or a plurality of image files obtained by imaging such a three-dimensional work of art from one or a plurality of directions that can be interpreted as the front or obtained by imaging such a three-dimensional work of art from various directions other than the front such as the side, the rear, the upper side, and/or the lower side. The image file may be an image file obtained by imaging the entire work of art and/or may be an image file obtained by imaging only one or a plurality of specific parts in the work of art. The image file may have image files having different numbers of pixels, different image qualities, and the like respectively for the same imaging target in the work of art.

The information relating to the creation place of the work of art may include a country, an area, and the like where the work of art is created.

The information relating to the creator of the work of art may include information relating to the creator. For example, the information may include information included in a biographic table of the creator such as a name and nationality of the creator and a community to which the creator belongs. The person chronology may include a date of birth, a date of death, and the like.

The information relating to the type of the work of art may be information in a field to which the work of art belongs in the art history.

The information relating to the creation period of the work of art may be a creation start period, a creation end period, and the like.

The internal or external example local database unit to which the database unit is connectable may store information relating to social activities for works of art served for browsing in the first art facility. The information relating to social activities for works of art may include evaluation information, trade information, restoration information, and/or management information for the works of art.

Since the database unit stores such information relating to the social activities for works of art, there is an advantage that a person who can access such information can easily use the information for researches about such works of art themselves and researches about relations with other works of art.

The evaluation information about the work of art may be information obtained by evaluating the work of art. For example, the evaluation information may be information of various media such as a newspaper article, a magazine, a journal, a book, a movie, a drama, and the like on which critiques by critics are posted. The evaluation information may be information of such contents converted into a file.

The management information about the work of art may be a part or all of information relating to transactions from a point in time when the work of art is created by the creator to the present. The management information about the work of art may be, for example, a seller, a purchaser, an intermediary, a lender, a borrower, a sales/purchase date, a rent date, a return date, a sales/purchase place, a transaction amount, a sales/purchase market, information indicating sales, information related to other sales, and the like about the work of art. The information indicating trade may be a purchase slip, a receipt, living things used at the time of custom clearance, a document used for transportation, or the like. The information relating to buying and selling may be, for example, information concerning an advertisement for buying and selling the work of art, information of an auction, information indicating the buying and selling, or the like. For works of art, there is an advantage that it is possible to determine the authenticity of such a work of art according to information concerning transactions from a creation point in time to the present. Note that, for all works of art, not all of information concerning transactions from creation points in time to the present are always present. Even when a part of the information is missing, the information is still information for determining the authenticity of the works of art. In these kinds of information, for physical objects such as a purchase slip and a receipt, the information may be stored as a file in a form of an image captured by an imaging device.

The restoration information of the work of art may be information relating to restoration of the work of art. For example, the restoration information about the work of art may be a person who has restored the work, a restoration organization, a restoration place, a restoration time (for example, a restoration start time, a restoration end time, and a restoration period), and the like.

An internal or external local example database unit to which the database unit is connectable may store information served for commentary of a work of art provided in the first art facility. The information served for the commentary of the work of art may include sound, a moving image, and/or text.

The information served for the commentary of the work of art may be information for introducing the work of art to ordinary people, information for introducing the work of art to children, and/or information for explaining the work of art to experts of such a work of art.

The information served for the commentary of the work of art may be in various forms and may be, for example, a moving image, sound, a still image, and/or text.

The information served for the commentary of the work of art may include an image obtained by imaging the work of art. The image quality of the image obtained by imaging the work of art may be equal to or higher than predetermined image quality and may be the number of pixels as high as a degree enough for guaranteeing actual quality of the work of art. There is an advantage that deterioration can be prevented by imaging and digitizing the work of art. By imaging the work of art with a high number of pixels, there is an advantage that it is possible to store the work of art in a state close to a real state and it is possible to reproduce the work of art satisfactory for appreciation.

The information served for the commentary of the work of art may include text. Only the text may be able to be acquired from a given file and stored. Such stored text information may be used for an application on the WEB.

The internal or external example local database unit to which the database unit is connectable may store information relating to an event held in correlation with the first art facility.

The event held in correlation with the first art facility may be various entertainments held in the first art facility and may include, for example, an exhibition held in the first art facility, a seminar held in the first art facility, and an educational activity held in the first art facility.

Such information relating to the event may include various kinds of information. For example, information relating to one event may include a work of art use in such an event, materials for establishing the work of art used in such an event, and/or positioning of such an event in terms of art. The positioning of the event in terms of art may include, for example, information such as a specific era (classical, modern, etc.) to which the work of art is directed, a specific country (Japan, France, Italy, etc.) targeted by the work of art, and a specific artist targeted by the work of art.

The information relating to the event may include information concerning the event itself. The information concerning the event itself may include, for example, a holding period of the event (from a holding start date to a holding end date), a total number of participants in the event, an advertisement for the event, and information concerning evaluation for the event.

The internal or external local example database unit to which the database unit is connectable may store information relating to a work of art having a predetermined relationship with one work of art in the first art facility and/or the second art facility. Here, the work of art having the predetermined relationship with the one work of art may include a work of art created by a creator of the one work of art, a work of art created by a creator in a group to which the creator of the one work of art belongs, a work of art created in series with the one work of art, and/or a work of art created in the same period as a creation age of the one work of art. The information relating to the work of art having the predetermined relationship with the work of art may include, for example, information about an art facility that serves the work of art having the predetermined relationship with the work of art for browsing and/or information for explaining the work of art having the predetermined relationship with the work of art explained above. The work of art having the predetermined relationship with the one work of art explained above may include information for explaining the work of art having the predetermined relationship with the one work of art explained above in correlation with the one work of art in the first art facility and/or the second art facility.

An example system may include a main database unit. Such a main database unit may store a part or all of the information acquired from each of the internal or external database units explained above. A management unit of the main database unit may cooperate with the internal or external local database units explained above to store, at predetermined timing, in the main database unit, the information in the internal or external local database units. The predetermined timing for storing the information in the main database unit may be defined in various periods such as every day, every week, and every month. For the acquisition of the information in the internal or external local database units in the main database unit, a method of storing only a changed place in the external local database units in the main database unit may be adopted.

Further, the information in the main database unit in the example system may be searchable with an ID number correlated with one work of art. For example, when the database units explained above is provided from the outside, even when an implementation method for the database units is sometimes different and a cross-sectional search difficult, there is an advantage that efficient and cross-sectional search is enabled in the main database unit and necessary information can be acquired by storing only related information among the information of the external database unit in the main database unit as explained above.

When all of one or a plurality of local database units are external database units, the database unit in the system in the embodiment includes the main database unit but may not include the one or the plurality of local database units.

Figure 2:
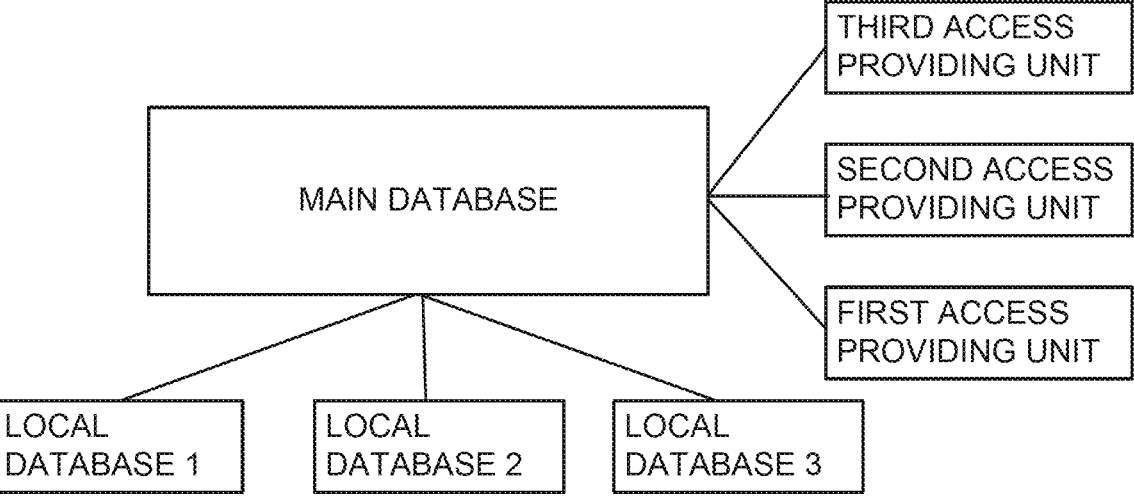
FIG. 2 is a block diagram illustrating a configuration of the system according to the embodiment.

In the case of such a configuration, the system in the embodiment may have, for example, a configuration illustrated in FIG. 2.

When all of the one or the plurality of local database units are internal database units, the database unit in the system in the embodiment may include the main database unit and the one or the plurality of local database units.

When a part of the one or the plurality of local database units are internal database unit and the rests are external database units, the database unit in the system in the embodiment includes the main database unit and the one or the plurality of internal local database units but may not include the one or the plurality of external local database units.

The main database unit may store first art data, second art data, and third art data.

The first art data is data that can be provided by a first access providing unit explained below. The first art data may include, for example, data to be, for example, browsed, created, managed, or used by a researcher or the like explained below. The first art data may be, for example, only data that is, for example, browsed, created, managed, used, or the like by the researcher or the like explained below.

The second art data is data that can be provided by a second access providing unit explained below. The second art data may include, for example, served for browsing by ordinary people only in a second art facility explained below. The second art data may be, for example, only data served for browsing by ordinary people only in the second art facility explained below.

The third art data is data that can be provided by a third access providing unit explained below. The third art data may include, for example, data served for browsing from the general Internet. The third art data may be, for example, only data served for browsing from the general Internet explained below.

The main database unit may include information indicating which of the first art data, the second art data, and the third art data, the first art data and the second art data, the first art data and the third art data, and the first to third art data to be stored. The main database unit may have a function of enabling setting as to which of the first art data, the second art data, the third art data, the first art data and the second art data, the first art data and the third art data, and the first to third art data the data to be stored is. Such data to be stored may be in units of files and/or in units of folders.

The main database unit may store the same data of the first art data and the second art data in the same place in a storage device or may store the same data in different places in the storage device. The main database unit may store the same data of the first art data and the third art data in the same place in the storage device or may store the same data in different places in the storage device. The main database unit may store the same data of the second art data and the third art data in the same place in the storage device or may store the same data in different places in the storage device. Here, the storing data in the same place may storing, for the same data, shared data that can be used as any part or all of the first art data, the second art data, and/or the third art data. Such a configuration may be an aspect in which the first art data, the second art data, and/or the third art data can be distinguished, for example, by a flag correlated with the data.

The main database unit may include one or a plurality of database units. For example, the main database unit may include three database units. In this case, in this application document, the main database units are sometimes referred to as first main database unit, second main database unit, or third main database unit. Note that, when the main database unit includes three database units, as explained below, there is an advantage that the first art data relating to academic materials, the second art data relating to an art facility to be opened to the public, the third art data to be opened to the public, and data relating to a work of art relating to an art facility can be divided stepwise based on the data relating to the work of art.

When the main database unit includes the first main database unit, the first main database unit may store the first art data. The first main database unit may have a function of setting a network accessible to data to be stored and/or setting the first to third art data.

When the main database unit includes the second main database unit, the second main database unit may store the second art data.

When the main database unit includes the third main database unit, the third main database unit may store the third art data.

The main database unit may include one or a plurality of converters. The converters may have a function of changing content and/or a form of data.

For example, the main database unit may include a twelfth converter and the twelfth converter may be connectable to the first main database unit and the second main database unit. The twelfth converter may be set between the first main database unit and the second main database unit and may have a function of changing content and/or a form of data when the data in the first main database unit is moved into the second main database unit.

As explained below, the second main database unit may be connectable to the second access providing unit and, as an example, the second access providing unit may provide data in the second art facility. In this case, although the data in the first main database unit may be open to the public in the first art facility, when there is data that should not be opened to the public in the second art facility, by changing content and/or a form of the data with the converters, there is an advantage that the data that should not be opened to the public in the second art facility can be controlled not to be physically moved from the first main database unit to the second main database unit that can cooperate with the second art facility and confidentiality of the data can be physically maintained.

The main database unit may include a twenty-third converter and such a twenty-third converter may be connectable to the first main database unit and the second main database unit. The twelfth converter may be set between the first main database unit and the second main database unit and may have a function of changing content and/or a form of data when the data in the first main database unit is moved into the second main database unit.

As explained below, the third main database unit may be connectable to the third access providing unit and, as an example, the third access providing unit may provide data in the third art facility. In this case, although the data in the second main database unit may be open to the public in the second art facility, when there is data that should not be opened to the public in the third art facility, by changing content and/or a form of the data with the converters, there is an advantage that the data that should not be opened to the public in the third art facility can be controlled not to be physically moved from the second main database unit to the third main database unit that can cooperate with the third art facility and confidentiality of the data can be physically maintained.

The main database unit may or may not include converters between the main database unit and the one or the plurality of local database units. When such converters are included, for example, an eleventh converter may be connectable to a first local database unit and a first main database unit. The eleventh converter may be set between the first local database unit and the first main database unit and may have a function of changing content and/or a form of data when the data in the first local database unit is moved into the first main database unit.

Figure 3:
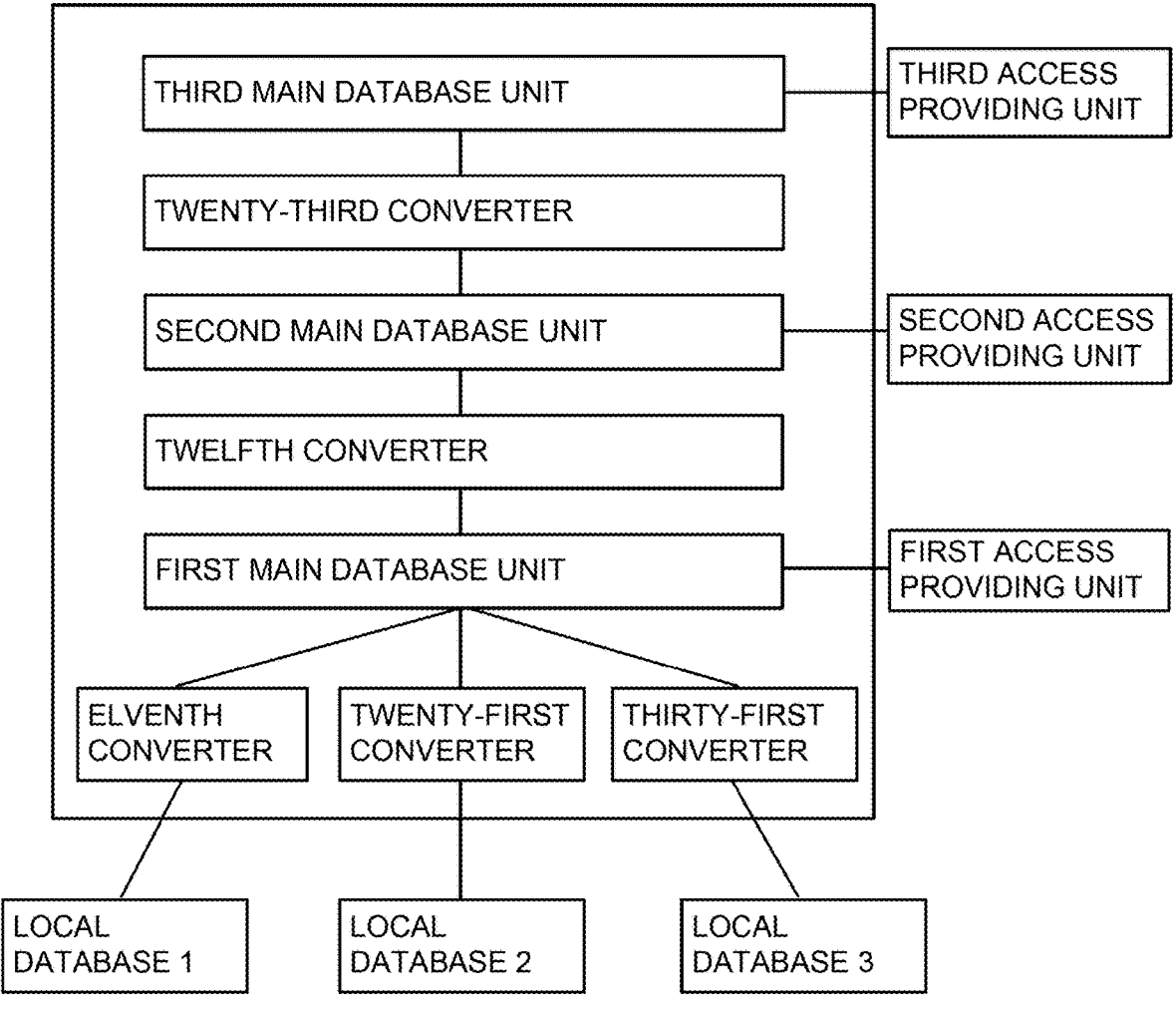
FIG. 3 is a block diagram illustrating the configuration of the system according to the embodiment.

FIG. 3 illustrates a configuration of such a system in the embodiment.

In the above explanation, the information processing apparatus that realizes the database unit may have various configurations and adaptations. For example, the database unit may one or a plurality of information processing apparatuses. The local database unit and the main database unit in the database unit may respectively configured by one or a plurality of information processing apparatuses. The first to third main database units and the converter units in the main database unit may be respectively configured by one or a plurality of information processing apparatuses. Since a plurality of functions can be configured by one information processing apparatus, for example, the first main database unit and a twelfth converter unit are configured by one information processing apparatus and the second main database unit and a twenty-third converter unit are configured by one information processing apparatus. Configurations are not limited to these and may be various configurations. The information processing apparatus that realizes the database may use various database technologies and various database models may be used. For example, there may be a relational data model, an object data model, a network type data model, a hierarchical data model, or the like. Various databases that implement such data models may be used.

Note that, for example, when a network connecting the first main database unit and the twelfth converter unit and a network of the second main database unit are made different, the data in the first main database unit and the data in the second main database unit can be physically different networks. Therefore, there is an advantage that confidentiality of the data in the first main database unit can be improved. In particular, when a firewall is set between the network connecting the first main database unit and the twelfth converter unit and the network of the second main database unit, it is possible to further control the transfer of data between the data in the first main database unit and the data in the second main database unit with the firewall. Therefore, there is an advantage that the confidentiality of the data can be improved.

Similarly, for example, when a network connecting the second main database unit and the twenty-third converter unit and a network of the third main database unit are made different, the data in the second main database unit and the data in the third main database unit can be physically different networks. Therefore, there is an advantage that the confidentiality of the data in the second main database unit can be improved. In particular, when a firewall is set between the network connecting the second main database unit and the twenty-third converter unit and the network of the third main database unit, it is possible to further control the transfer of data between the data in the second main database unit and data in a thirty-second main database unit with the firewall. Therefore, there as an advantage that confidentiality of data can be improved.

In the above explanation, the configuration in which the data in the third main database unit is acquired from the second main database unit is explained. However, together with or instead of such a configuration, the third main database unit and the first main database unit may be connected or a thirteenth converter unit may be provided between the third main database unit and the first main database unit and the thirteenth converter unit may change the content and/or format of the data in the first main database unit and transfer the data into the third main database unit. Similarly, when a network connecting the first main database unit and the thirteenth converter unit and the network of the third main database unit are made different or a firewall is set therebetween, there is an advantage that confidentiality of data can be improved as explained above.

2.2. First access providing unit 22

The first access providing unit provides access to the database unit. The first access providing unit provides a first network.

The first access providing unit may provide access to, for example, the information processing apparatus in the first art facility via the first network. The information processing apparatus in the first art facility may be capable of accessing the first access providing unit. The information processing apparatus in the first art facility may be, for example, an information processing apparatus (in this application document, sometimes referred to as "information processing apparatus for a researcher or the like") used by a person (in this application document, sometimes referred to as "researcher or the like") who studies, investigates, and/or creates materials for works of art in the first art facility. Such materials may be materials for experts or materials for ordinary people. The materials for ordinary people may include materials for adults or may include materials for children. The first access providing unit may be accessible from, for example, only the information processing apparatus in the first art facility via the first network. In this case, data managed by the first access providing unit is provided from the information processing apparatus in the first art facility. There is an advantage that confidentiality can be improved. The first access providing unit may be accessible from, for example, only the information processing apparatus set in the first art facility via the first network. In this case, the data managed by the first access providing unit is provided from the information processing apparatus set in the first art facility. There is an advantage that confidentiality can be improved.

In the system in the embodiment, the first art data in the database unit may be usable from the information processing apparatus for the researcher or the like via the first access providing unit. The first art data may be, for example, the data explained above that is browsed, created, managed, and/or used by the researcher or the like. Such first art data may include materials created for experts about works of art or may include materials created for ordinary people about works of art. The materials for ordinary people may include materials for adults or may include materials for children.

Note that the first art data may include the second art data and may be a superordinate concept of the second art data. The second art data may be data changed or corrected based on the first art data.

The first art data may include the third art data and may be a superordinate concept of the third art data. The third art data may be data changed or corrected based on the first art data.

When the database unit includes the first main database, the first access providing unit may be connectable to the first main database.

A facility including works of art is one of ideal research environments where researches on the works of art can be deepened. However, in order to deepen the researches on the works of art, it is preferable that there are not only the works of art themselves but also various related research materials. Although researchers of works of art often have the most advanced knowledge about the works of art, it is preferable that, at an early stage, such knowledge can be provided to general audiences, that is, visitors who visit to appreciate the works of art.

Therefore, when the system in the embodiment includes the database unit and the first access providing unit is capable of managing, for example, browsing and storing of specialized materials for works of art from the information processing apparatus connectable to the first access providing unit is capable of managing, for example, storing and browsing of materials for ordinary people, there is an advantage that it is possible to deepen researches on the works of art and at the same time create materials that can provide such knowledge to ordinary people at an early stage.

The first access providing unit may provide a function of enabling setting about which of the first art data, the second art data, the third art data, the first art data and the second art data, the first art data and the third art data, and the first to third art data the data stored in the main database unit is. Only the first access providing unit may provide the function for enabling setting about which of the first art data, the second art data, the third art data, the first art data and the second art data, the first art data and the third art data, and the first to third art data the data stored in the main database unit is. The second access providing unit and the third access providing unit may not be able to provide such a function. In this case, there is an advantage that an accessible range for data to be stored can be set only from the information processing apparatus in the first art facility provided by the first access providing unit. Such data to be stored may be in units of files and/or in units of folders. In this case, there is an advantage that the accessible range can be set more precisely.

A method of providing information by the first access providing unit may be unicast, may be broadcast, or may be multicast.

As a trigger for the first access providing unit to provide information, for example, the information may be transmitted in response to a request from a terminal carried by a visitor or may be transmitted without requiring a request from such a terminal. The information may be transmitted at a timing corresponding to the request from the terminal or the information may be transmitted without requiring the request from the terminal or at timing unrelated to the request.

Hardware configuring the first access providing unit may be, for example, an information processing apparatus including a communication function. The communication function may be wireless communication or wired communication. The information processing apparatus including the communication function may be, for example, in wireless communication, an information processing apparatus capable of performing wireless LAN communication. For example, the information processing apparatus may be a Wi-Fi connection apparatus, a Bluetooth apparatus, a near field communication apparatus, or the like and a standard of the information processing apparatus may be IEEE 802.11, IEEE 802.15, or the like but is not limited to these standards. In wired communication, the information processing apparatus may be an information processing apparatus capable of performing Ethernet communication. Note that the information processing apparatus including the communication function may include functions such as a repeater, a bridge, and a router.

2.3. Second access providing unit

The second access providing unit provides access to the database. The second access providing unit provides a second network.

The second access providing unit may provide access to, for example, the information processing apparatus in the second art facility via the second network. The information processing apparatus in the second art facility may be capable of accessing the second access providing unit.

The recent innovation of the information processing technology is remarkable. A period in which a most advanced device is substantially most advanced is about one to two months. Therefore, even if an art facility includes such a most advanced device and such a most advanced device included in the art facility is provided to visitors to the art facility, the device is not the most advance any more in a few months. Therefore, considering that a most advanced device is always provided in the art facility, an equipment burden is excessive large. Therefore, it is unrealistic to always provide the most advanced device.

When the system according to the embodiment includes the database unit and the second access providing unit, there is an advantage that, by providing an application to a latest portable information terminal (examples thereof include, but are not limited to, smart devices such as a smartphone, a tablet, a phablet, and a smartwatch) brought by a visitor to the art facility, appreciation of works of art can be supported by utilizing a most advanced device that the visitor can bring. In such a case, there is also an advantage that the visitor can appreciate the works of art by using a mobile terminal that the visitor usually uses and to which the visitor has attachment. Note that, when the second access providing unit provides access to the second art data based on materials created by researchers or the like concerning the works of art via the first access providing unit, as explained above, there is an advantage that the materials about the works of art created by the researchers or the like having knowledge concerning most advanced works of art can be opened to general people visiting the second art facility such as a museum and research results about the works of art can be opened to the public including the general people at an early stage.

The second network may be accessible by, for example, the information processing apparatus located in the second art facility. The information processing apparatus located in the second art facility may include, for example, an information processing apparatus set in the second art facility and usable by a visitor who visits the second art facility. The information processing apparatus located in the second art facility may include an information processing apparatus brought by the visitor who visits the second art facility.

The second access providing unit may be accessible only from, for example, the information processing apparatus in the second art facility via the second network. In this case, data provided by the second access providing unit is provided only to the information processing apparatus in the second art facility. There is an advantage that only the visitor who visits the second art facility can enjoy a merit of accessing the second art data.

The second access providing unit may provide the second art data in the database unit. The second art data may be, for example, materials created for ordinary people about works of art. The materials for ordinary people may include materials for adults or may include materials for children.

When the database unit includes the second main database, the second access providing unit may be connectable to the second main database.

The second art data may be accessible using Web API via the second network.

The WEB API may include various protocols that provide access to information such as HTML and CSV. When the system according to the embodiment enables access to information using the WEB API including various protocols for providing access to information, since the WEB API is a frequently used WEB API, there is an advantage that quick and flexible application development can be performed and adaptations to various new devices can be performed.

A method of providing information by the second access providing unit, a trigger for providing information by the second access providing unit, and/or hardware configuring the second access providing unit may be respectively the same as or may be different from those in the first access providing unit explained above.

When the first art facility and the second art facility are the same facility, the first network provided by the first access providing unit and the second network provided by the second access providing unit may be different networks. For example, in a museum as the same facility, the second access providing unit may provide a second network accessible in regions from the basement to the third floor and the first access providing unit may provide a first network accessible in regions of the fourth floor or an additional building.

2.4. Third access providing unit

The third access providing unit provides access to the database. The third access providing unit provides a third network. The third network may be the general Internet.

When the database unit includes the third main database, the third access providing unit may be connectable to the third main database.

A method of providing information by the third access providing unit, a trigger for providing information by the third access providing unit, and/or hardware configuring the third access providing unit may be the same as or different from those in the first access providing unit explained above.

3. System according to the embodiment

3.1. Configuration of the system according to the embodiment

Figure 4:
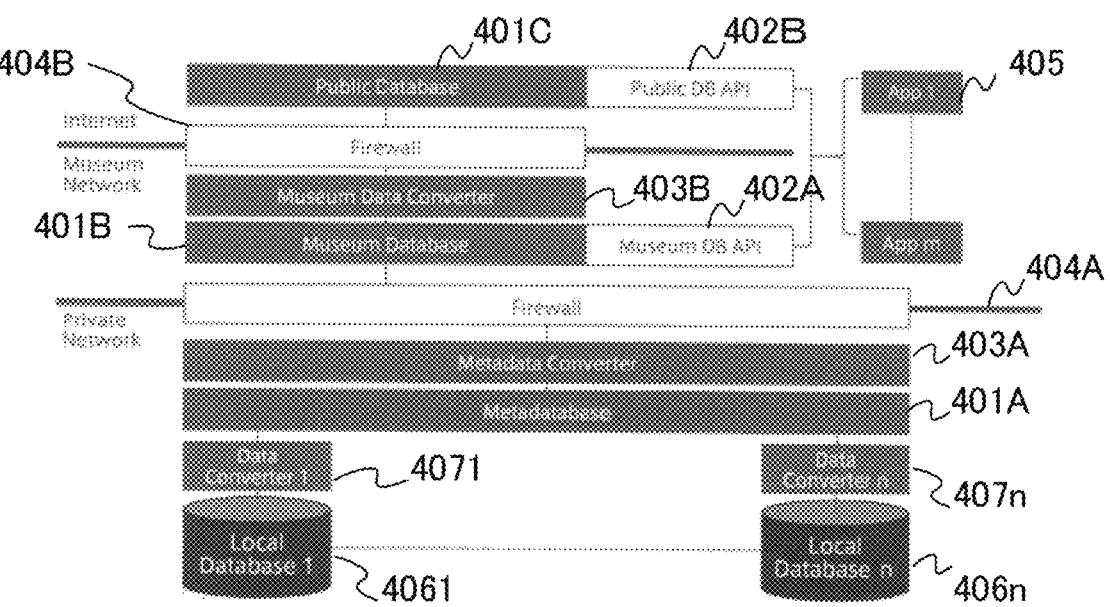
FIG. 4 is a block diagram illustrating the configuration of the system according to the embodiment.
Figure 6:
FIG. 6 is an example of a screen displayed by the system according to the embodiment.

The system according to the embodiment may be a system including a main database unit, the main database unit being configured from a first main database unit to a third main database unit and including a first access providing unit that provides access to the first main database unit, a second access providing unit that provides access to the second main database unit, and a third access providing unit that provides access to the third main database unit. FIG. 4 is an example of such a system. Here, the first main database unit may correspond to a meta database 401A, the second main database unit may correspond to a museum database 401B, and the third main database unit may correspond to a public database 401C.

The first access providing unit may provide access to be connectable to the meta database (not illustrated). When the first access providing unit provides access to the meta database, there is an advantage that, for example, access can be made from an information processing apparatus for researchers or the like set in a first art facility, which is a facility where researchers or the like perform researches or the like and it is possible to access the first art data and perform researches about works of art or create materials.

The second access providing unit may provide access to the museum database via a museum DBAPI 402A. When such a second access providing unit provides access to the museum database, for example, there is an advantage that a visitor who visits the second art facility such as a museum can access the second art data in the museum database using a most advanced information processing apparatus brought by the visitor.

The third access providing unit may provide access to the public database via a public DBAPI 402B. When such a third access providing unit provides access to the public database, for example, there is an advantage that a visitor before or after visiting the second art facility such as a museum can access the third art data in the public database using the most advanced information processing apparatus brought by the visitor.

Here, App1 to m405 illustrate applications on information processing apparatuses brought by visitors to the museum and indicate that the visitors can access the public database outside the museum via a public DBAPI using information processing apparatuses usually used by the visitors and indicate that the visitors can access the museum database in the museum using the same information processing apparatuses usually used by the visitors.

When the system in the embodiment includes a metadata converter 403A which is the twelfth converter, when data is stored in the museum database based on the data in the meta database, there is an advantage that content or a form of the data can be changed according to necessary, that is, about data satisfying a predetermined condition. For example, since the museum database stores data that can be opened to general visitors who visit the museum provided as the second art facility, it is sometimes unsuitable to open data in one file or data in one folder to be opened to the public. It is unsuitable to open the data to the public, for example, when a license for opening the data to the public is not obtained in terms of a contract. Therefore, when the data is stored in the museum database based on the data in the meta database, the data in the meta database may be directly moved to the museum database in some cases or the data after the metadata converter 403A performs data change processing on the data in the meta database satisfying a predetermined condition based on a predetermined conversion rule may be moved to the museum database in other cases. With such a configuration, there is an advantage that such an appropriate adaptation can be enabled. Here, examples of the predetermined condition include inclusion of data not licensed for opening to the public. Examples of the corresponding predetermined conversion rule include changing processing for deleting the data not licensed or changing processing for changing the data to other data. In this way, the metadata converter 403A, which is the twelfth converter, may generate the second art data in the museum database based on the first art data in the meta database.

In addition, when timing when the system according to the embodiment stores data in the museum database based on the data in the meta database is, for example, predetermined time every day, there is an advantage that the system can quickly change or correct the data opened to the public in the museum.

Similarly, when the system in the embodiment includes a museum data converter 403B which is the twenty-third converter, when data is stored in the public database based on the data in the museum database, there is an advantage that content or a format of the data can be changed according to necessary, that is, for data satisfying a predetermined condition. For example, since data that can be opened to the outside on the Internet is stored in the public database, in some case, it is sometimes unsuitable to open data in one file or data in one folder to the public. It is unsuitable to open the data to the public, for example, when the data should be kept in opening in a museum from the contract point of view or an artistic point of view. Therefore, when the data is stored in the public database based on the data in the museum database, the data in the museum database may be directly moved to the public database in some case and the data after the museum data converter 403B performs the data change processing on the data in the museum database satisfying a predetermined condition based on a predetermined conversion rule may be moved to the public database in other cases. As an example of such a case, for example, it is conceived that data of an image having resolution equal to or higher than first predetermined resolution that is captured for a certain work of art and can depict details is opened to the public in a museum. When storing such image data in the public database, the museum data converter may convert the resolution of such an image into image data having second predetermined resolution lower than the first predetermined resolution. This makes it possible to obtain the advantages explained above. In this way, the museum data converter 403B, which is the twenty-third converter may generate the third art data in the public database based on the second art data in the museum database generated based on the first art data in the meta database. Note that, as another aspect, as explained above, the thirteenth converter may directly generate the third art data based on the first art data.

When timing when the system according to the embodiment stores data in the public database based on the data in the museum database is, for example, predetermined time every day, there is an advantage that it is possible to quickly change or correct data to be opened to the public.

The system in the embodiment may include a firewall 404A between the network including the meta database and the network including the museum database. In this case, there is an advantage that access to information between the network including the meta database and the network including the museum database can be restricted and the security of the meta database can be improved.

The system in the embodiment may include a firewall 404B between the network including the museum database and the network including the public database. In this case, there is an advantage that access to information between the network including the museum database and the network including the public database can be restricted and the security of the museum database can be improved.

The system according to the embodiment may perform, for example, display illustrated in FIG. 5. Explanation about such a system may be displayed.

The first main database unit may be connectable to the first to fifth local databases. Note that, in this figure, the first to fifth local databases are illustrated as local databases 4061 to 406n.

A first local database may be a database that stores various kinds of work of art information explained above. Such a database may be a commercial system and, for example, may be able to be logged in from a login screen illustrated in FIG. 5. Such a system may store various kinds of work of art information and may include a search function. For example, FIG. 7 is an example of a display screen for the search function of such a database.

Figure 8:
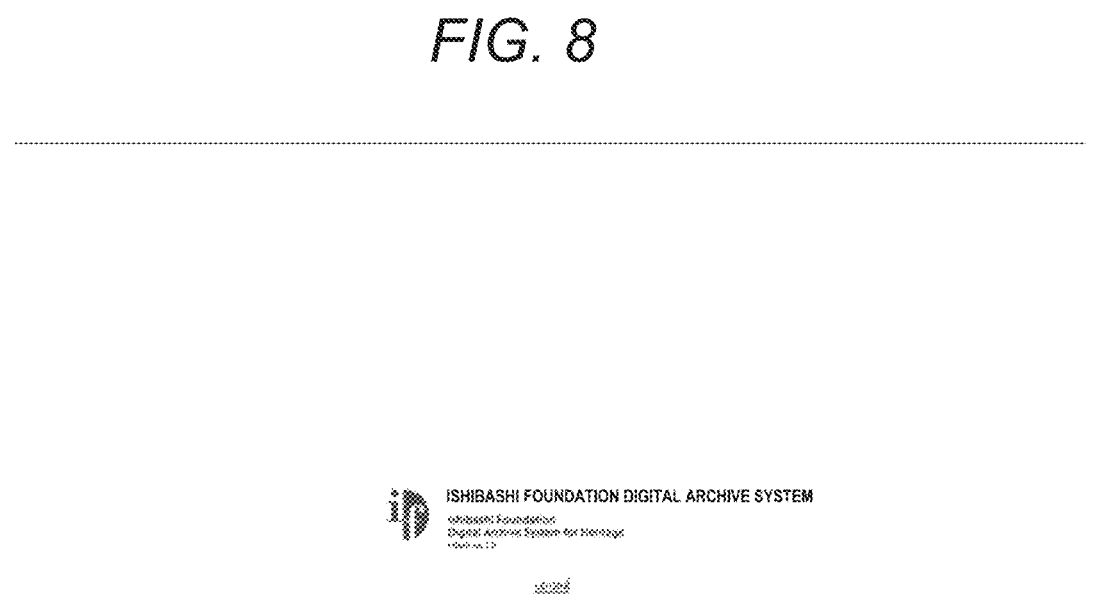

A second local database may be a database that stores information relating to the social activities for works of art explained above. For example, the second local database may be able to be logged in from a login screen illustrated in FIG. 8. Such a system may store various kinds of work of art information and may include a search function. For example, FIG. 9 is an example of a display screen of the search function of such a database.

Figure 10:
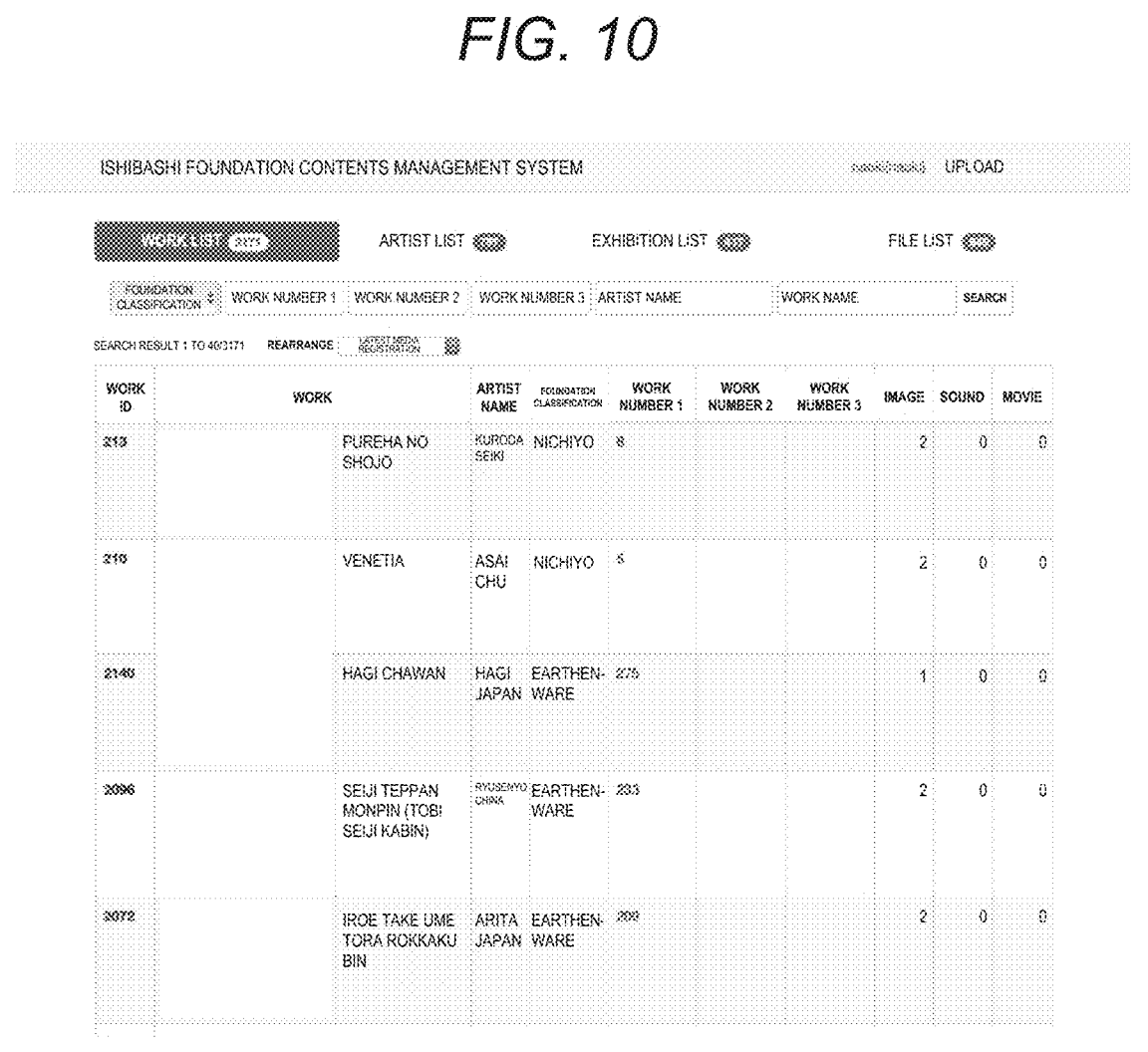

A third local database may be a database that stores information for explaining works of art explained above in a form of a photograph, sound, and a moving image. FIG. 10 is an example of a screen on which information for explaining works of art is searched. In such a screen, an image obtained by imaging a work of art, a name of the work of art, a creator name, a classification, a work number, and an image, sound, and a moving image for explaining such a work of art are displayed in correlation with a work ID. Such a screen may be displayed based on the fact that such a database stores these data in correlation with each other.

Figure 11:
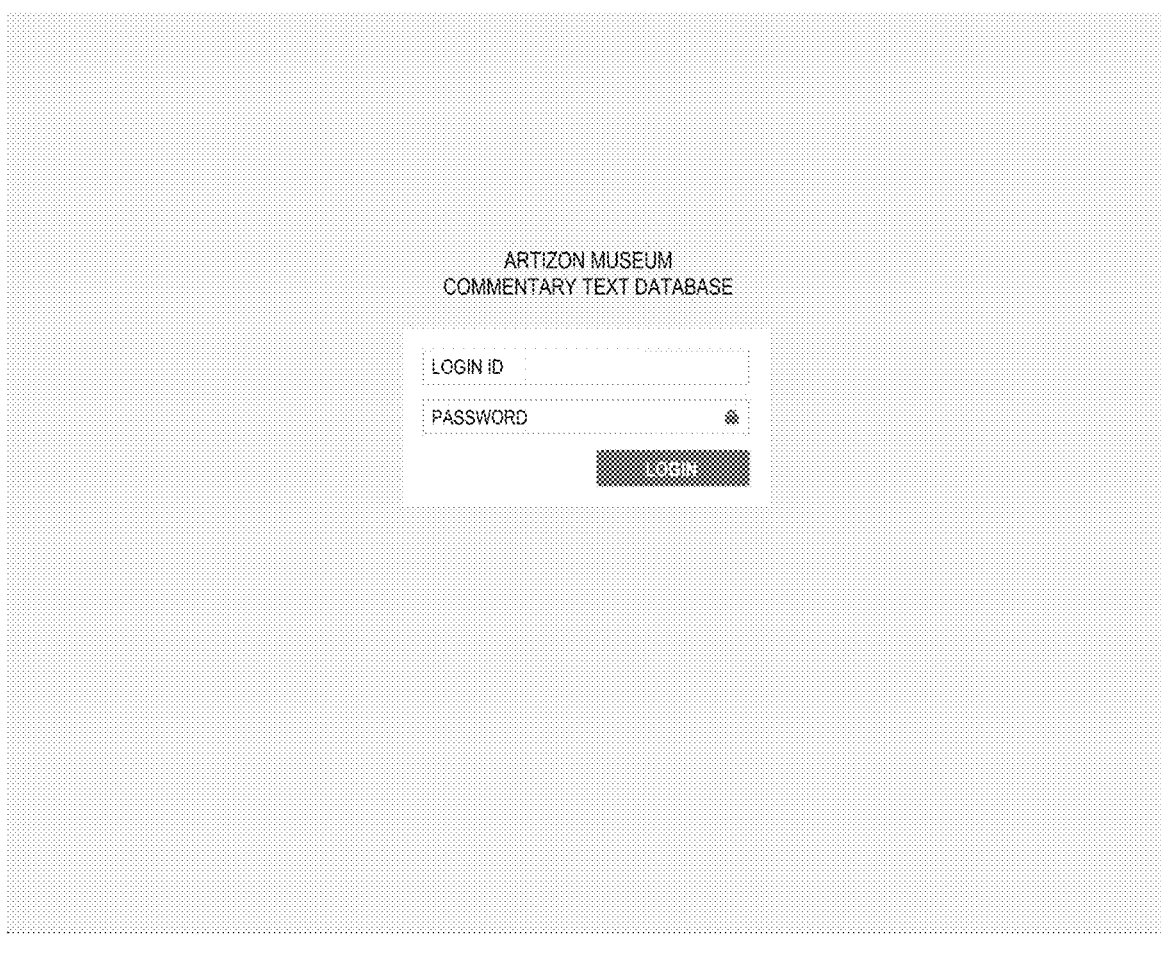
FIG. 11 is an example of a screen displayed by the system according to the embodiment.

A fourth local database may be a database that stores information served for commentary of works of art explained above in the text format explained above. For example, the fourth local database may be able to be logged in from a login screen illustrated in FIG. 11. Such a system may store information served for commentary of works of art in a text format and may include a search function. For example, FIG. 12 is an example of a display screen of the search function of such a database.

A fifth local database may be a database that stores information relating to an event.

The first main database unit may acquire and store set predetermined data from the first to fifth local databases at predetermined time every day. The first main database unit may also store data from information processing apparatuses other than the first to fifth local databases. For example, data stored by the information processing apparatus for researchers or the like may be stored in the first main database unit. The data moved to the first main database unit may be set as the first art data as initial setting of a disclosure range. Accordingly, there is an advantage that a risk of unintended leakage of information such as opening data moved anew to a museum or opening via the Internet can be reduced. Note that files and folders held in advance before such acquisition may be maintained without changing the setting of the disclosure range set before such acquisition (for example, the first art data, the second art data, and the third art data). In this case, since the preset disclosure range is not changed to the first art data, there is an advantage that a burden of setting the disclosure range again is reduced.

3.2. Flow of the system according to the embodiment

Step 1

The first art data is stored in the first main database such as the meta database from the first to fifth local databases at first predetermined time every day.

Step 2

The second art data is stored in the second main database unit such as the museum database from the first main database unit at second predetermined time every day.

Step 3

The third art data is stored in the third main database unit such as the public database from the first main database unit or the second main database unit at third predetermined time every day.

Note that, in the above explanation, the data may not be stored again for a file in which the data is already stored, the file being the same files. In this case, the system in the embodiment may check only the identity of the files and may not perform the storage processing again when it is determined that the files are the same.

It may be possible to set, at any time in the flow explained above, as the data in the first main database unit, the first art data, the second art data, the third art data, the first art data and the second art data, the first art data and the third art data, and the first to third art data.

4. Configuration of the system according to the embodiment

Figure 14:
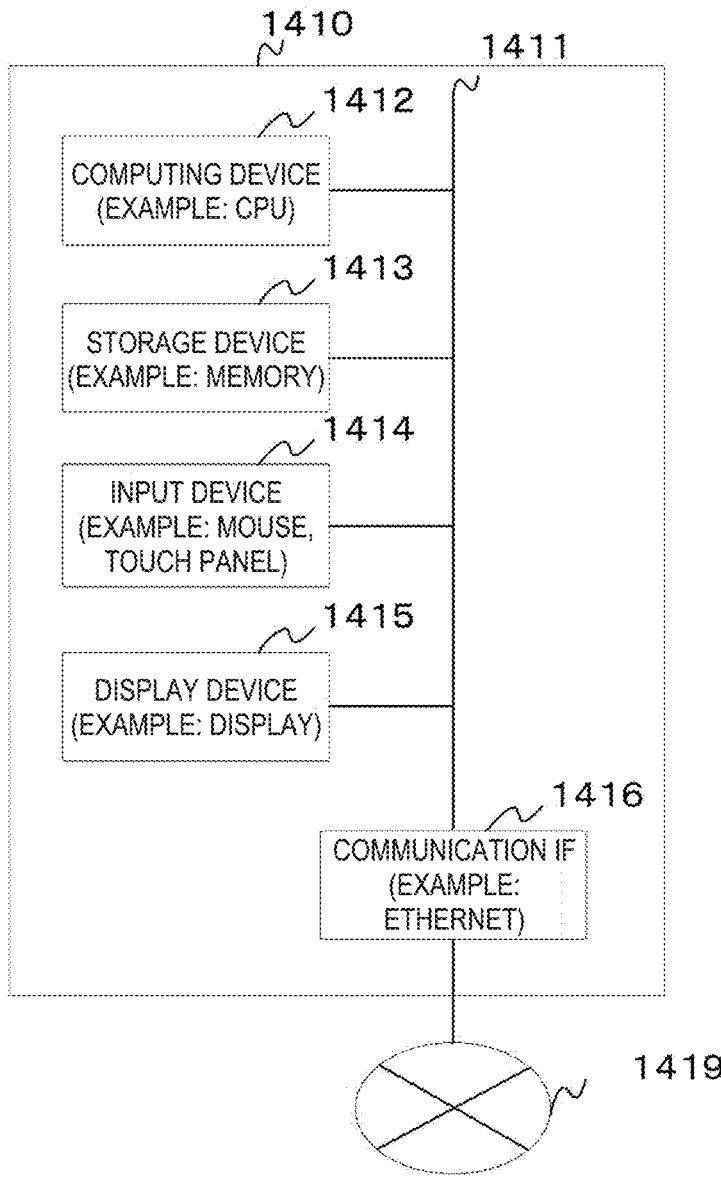
FIG. 14 is a block diagram illustrating a configuration of an information processing apparatus according to the embodiment.

The system according to the embodiment may be configured from one or a plurality of information processing apparatuses. An information processing apparatus 1410 is explained as an example of such an information processing apparatus. As illustrated in FIG. 14, the information processing apparatus may include a bus 1411, a computing device 1412, a storage device 1413, and a communication IF 1416. The information processing apparatus may include an input device 1414 and a display device 1415. The information processing apparatus is directly or indirectly connected to a network 19.

The bus may have a function of transmitting information between the computing device, the storage device, the input device, the display device, and/or the communication IF.

Examples of the computing device include a processor. The computing device may be a CPU or an MPU. The computing device may include a graphics processing unit or a digital signal processor. In short, the computing device only has to be a device that can execute an instruction of a program.

The storage device is a device that records information. The storage device may be either an external memory or an internal memory and may be either a main storage device or an auxiliary storage device. The storage device may be a magnetic disk (a hard disk), an optical disk, a magnetic tape, a semiconductor memory, or the like. The storage device may include a storage device connected via a network or a storage device on the Cloud connected via a network.

Note that a register, an L1 cache, an L2 cache, and the like that store information in a position physically close to the computing device may be included in the computing device as a design of a computer architecture or may be included in the storage device. In short, the computing device, the storage device, and the bus only have to be configured to be able to execute information processing in cooperation with one another.

The storage device can include a program for executing the system according to the embodiment. The storage device can record, as appropriate, data necessary in executing the system according to the embodiment. The storage device may include a database or the information processing apparatus itself may be the database.

In the above explanation, the computing device is executed based on the program provided in the storage device. However, as one of forms in which the bus, the computing device, and the storage device are combined, the information processing relating to the system according to the embodiment may be realized by a programmable logic device that can change a hardware circuit itself or a dedicated circuit in which information processing to be executed is determined.

The input device inputs information but may have other functions. The input device may be an input device such as a keyboard, a mouse, a touch panel, or a pen-type pointing device.

The display device has a function of displaying information. Examples of the display device include a liquid crystal display, a plasma display, and an organic EL display. In short, the display device only has to be a device that can display information. The display device may include an input device in a part thereof like a touch panel.

The network transmits information in conjunction with the communication IF. That is, the network has a function of enabling information in the information processing apparatus to be transmitted to other information processing terminals (not illustrated) via the network.

Hardware configuring the information processing apparatus according to the embodiment of the present invention may be a general-purpose electronic computer or a dedicated electronic computer. The hardware may be a workstation, a desktop computer, a laptop computer, a notebook computer, a PDA, a cellular phone, a smartphone, or the like.

Although the information processing apparatus is explained as one information processing apparatus in this figure, the information processing apparatus may be configured by a plurality of information processing apparatuses. The plurality of information processing apparatuses may be internally connected or may be externally connected via a network. The information processing apparatus may be a physical entity or may be a virtual entity. For example, the information processing apparatus may be realized by using Cloud computing. In particular, a database or the like may be realized by the Cloud. When the information processing apparatus is configured by the plurality of information processing apparatuses, owners of the information processing apparatuses may be different. A person who operates the information processing apparatus as the system according to the present invention may be different from an owner of the information processing apparatus. For example, when the system according to the embodiment is realized by the Cloud, a part of the system according to the embodiment may be a system relating to an owner and a database or the like in the system according to the embodiment may be the Cloud of a different owner. In this case, the system according to the embodiment includes portions relating to transmission of data to the Cloud of such another owner and reception from the Cloud. However, such a system according to the embodiment may not include the portions included in the Cloud.

It goes without saying that the invention examples explained in the embodiments of this application document are not limited to those explained in this application document and can be applied to various examples within the scope of the technical ideas of the invention examples. For example, in the embodiments of this application document, the systems in the embodiments may be configured such that the information presented on the screen of the information processing apparatus can be transmitted to the other information processing apparatus to be displayed on the screen of the other information processing apparatus.

Various kinds of processing and procedures explained in this application document may be realized not only by those explicitly explained in the embodiments explained above but also by those implicitly explained based on the technical ideas of the configurations explained above or may be realized by software, hardware, or a combination thereof. A part or all of the kinds of processing and procedures explained in this application document may be implemented as a computer program and can be executed by various computers. These computer programs may be stored in a storage medium. These programs may be stored in a non-transitory or temporary storage medium.

REFERENCE SINGS LIST 401A meta database
401B museum database
401C public database
402A museum DBAPI
402B public DBAPI
403A metadata converter
403B museum data converter
404A firewall
404B firewall
405 application on the information processing apparatus
4061 first local database
406*n* n-th local database
4071 first data converter
407*n* n-th data converter
1410 information processing apparatus
1411 bus
1412 computing device
1413 storage device
1414 input device
1415 display device
1416 communication IF
1419 network

The invention claimed is:

1. A computer system comprising:
a memory storage device storing program instructions, and being configured to store
first art data, second art data, and third art data; and
a computer processing device configured to execute the program instructions to:
access the first art data in the memory storage device and provide the first art data via a first network in a first art facility;
access the second art data in the memory storage device and provide the second art data, at least partially changed, based on the first art data via a second network in a second art facility, wherein the second network is a physically different network from the first network and is firewall-separated from the first network;
convert at least one of a content or an electronic format of at least one of the first art data or the second art data according to a predetermined conversion rule so as to generate the third art data, wherein
the corresponding at least one of the first art data or the second art data includes an image file relating to imaging one work of art, and
the predetermined conversion rule converts a resolution of the image file to a lower image resolution; and
provide the third art data via a third network accessible to the public, wherein the third network is a physically different network from the first network and the second network and is firewall-separated from the first network and the second network, and
the first network is accessible from a terminal located in the first art facility, the terminal being configured for creation of data relating to a work of art served for browsing in the second art facility.

2. The computer system according to claim 1, wherein
a part or all of data relating to a work of art served for browsing in the second art facility is the second art data stored in the memory storage device during a predetermined period of time.

3. The computer system according to claim 1, further comprising
the terminal located in the first art facility, wherein the terminal located in the first art facility is configured to display at least any one or more of
the first art data,
the second art data, and
the third art data.

4. The computer system according to claim 1, wherein
the second art data includes data about a work of art served for browsing in the second art facility.

5. The computer system according to claim 1, wherein
the second network is accessible from a terminal in the second art facility.

6. The computer system according to claim 1, wherein
the second art data is accessible using a Web API via the second network.

7. The computer system according to claim 1, wherein
the second art data includes data about an art facility relating to a work of art having a predetermined relationship with one work of art located in the second art facility.

8. The computer system according to claim 1, wherein
the second art data includes data of a work of art having a predetermined relationship with one work of art located in the second art facility.

9. The computer system according to claim 1, wherein
the computer system is configured to communicate with one or a plurality of databases that store a part or all of the first art data.

10. The computer system according to claim 9, wherein
the one or a plurality of databases store work of art information about a work of art stored in the first art facility.

11. The computer system according to claim 9, wherein
the one or a plurality of databases include historical information about a work of art served for browsing in the first art facility.

12. The computer system according to claim 9, wherein
the one or a plurality of databases store data served for commentary on a work of art provided in the first art facility.

13. The computer system according to claim 12, wherein
the data served for commentary on the work of art includes one or more of sound, a moving image, and text.

14. The computer system according to claim 9, wherein,
in the one or the plurality of databases, information relating to the first art data is managed with a work of art name and an ID or a creator and an ID of the work of art.

15. The computer system according to claim 1, wherein
the first art facility and the second art facility are located in a same location.

16. The computer system according to claim 1, wherein
the second art data comprises data that is licensed and data that is not licensed; and
the predetermined conversion rule deletes the data that is not licensed or replaces the data that is not licensed with other data.

* * * * *